(12) United States Patent
Horinouchi

(10) Patent No.: US 10,304,345 B2
(45) Date of Patent: May 28, 2019

(54) UNMANNED AERIAL VEHICLE

(71) Applicant: Panasonic Intellectual Property Management Co., Ltd., Osaka (JP)

(72) Inventor: Takashi Horinouchi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 90 days.

(21) Appl. No.: 15/699,410

(22) Filed: Sep. 8, 2017

(65) Prior Publication Data

US 2017/0372625 A1    Dec. 28, 2017

Related U.S. Application Data

(63) Continuation of application No. PCT/JP2016/000684, filed on Feb. 10, 2016.

(30) Foreign Application Priority Data

Mar. 12, 2015  (JP) .................................. 2015-050023

(51) Int. Cl.
*G08G 5/04* (2006.01)
*G06K 9/46* (2006.01)
(Continued)

(52) U.S. Cl.
CPC .............. *G08G 5/045* (2013.01); *B64C 27/08* (2013.01); *B64C 39/024* (2013.01); *B64D 47/08* (2013.01);
(Continued)

(58) Field of Classification Search
CPC .... G08G 5/045; G08G 5/0004; G08G 5/0021; G08G 5/0069; G08G 5/0078;
(Continued)

(56) References Cited

U.S. PATENT DOCUMENTS 6,278,904 B1    8/2001  Ishii
9,417,325 B1*   8/2016  Bry ..................... G01S 13/9303
(Continued)

FOREIGN PATENT DOCUMENTS

JP         9-325245       12/1997
JP         11-139396       5/1999
(Continued)

*Primary Examiner* — David F Dunphy
(74) *Attorney, Agent, or Firm* — Wenderoth, Lind & Ponack, L.L.P.

(57) ABSTRACT

An unmanned aerial vehicle according to the present disclosure is an unmanned aerial vehicle that can fly in midair and includes a propulsion unit configured to generate a propulsion force for fly in midair, a laser light source configured to illuminate laser light, an imaging unit configured to generate a captured image by capturing vertically below the unmanned aerial vehicle during flight in midair, and a controller configured to control an operation of the propulsion unit. The controller analyzes a captured image, extracts a light spot formed by laser light, measures a positional relationship with another unmanned aerial vehicle based on the extracted light spot, and executes a collision avoidance operation with respect to another unmanned aerial vehicle based on the measured positional relationship.

4 Claims, 6 Drawing Sheets

(51) Int. Cl.
*G06K 9/00* (2006.01)
*G05D 1/00* (2006.01)
*B64C 39/02* (2006.01)
*G08G 5/00* (2006.01)
*B64C 27/08* (2006.01)
*B64D 47/08* (2006.01)
*G05D 1/02* (2006.01)
*B64D 47/06* (2006.01)

(52) U.S. Cl.
CPC ............. *G05D 1/0027* (2013.01); *G05D 1/02* (2013.01); *G06K 9/00664* (2013.01); *G06K 9/4604* (2013.01); *G08G 5/0004* (2013.01); *G08G 5/0021* (2013.01); *G08G 5/0069* (2013.01); *G08G 5/0078* (2013.01); *B64C 2201/024* (2013.01); *B64C 2201/042* (2013.01); *B64C 2201/108* (2013.01); *B64C 2201/12* (2013.01); *B64C 2201/141* (2013.01); *B64C 2201/143* (2013.01); *B64C 2201/145* (2013.01); *B64C 2201/146* (2013.01); *B64D 47/06* (2013.01)

(58) Field of Classification Search
CPC ....... B64C 27/08; B64C 39/024; B64D 47/08; G05D 1/0027; G05D 1/02; G06K 9/00664; G06K 9/4604
See application file for complete search history.

(56) References Cited

U.S. PATENT DOCUMENTS

| | | |
|---|---|---|
| 2002/0027652 A1 | 3/2002 | Paromtchik et al. |
| 2003/0043058 A1* | 3/2003 | Jamieson ............. G01C 23/005 340/961 |
| 2012/0078451 A1 | 3/2012 | Ohtomo et al. |
| 2014/0081567 A1* | 3/2014 | Kirk ......................... G08G 5/04 701/301 |
| 2015/0134150 A1* | 5/2015 | Farjon .................. G05D 1/0202 701/3 |
| 2015/0277440 A1* | 10/2015 | Kimchi .................... G01S 17/08 701/26 |
| 2015/0379876 A1* | 12/2015 | Navot .................. G08G 5/0021 701/301 |
| 2016/0156406 A1* | 6/2016 | Frolov ............... H04B 7/18504 455/431 |

FOREIGN PATENT DOCUMENTS

| | | |
|---|---|---|
| JP | 2002-6784 | 1/2002 |
| JP | 2002-82720 | 3/2002 |
| JP | 2003-341599 | 12/2003 |
| JP | 2004-268722 | 9/2004 |
| JP | 2006-285635 | 10/2006 |
| JP | 2012-71645 | 4/2012 |

* cited by examiner

UNMANNED AERIAL VEHICLE

BACKGROUND

1. Technical Field

The present disclosure relates to an unmanned aerial vehicle that makes unmanned flight in midair.

2. Description of Related Art

JP 2003-341599 A discloses an information providing system that provides information such as characters and graphics by making a plurality of flapping flying robots equipped with light-emitting elements float in midair. More specifically, the information providing system disclosed in JP 2003-341599 A provides information such as characters and graphics by using a plurality of flapping flying robots, which float in midair, as a dot matrix. Each of the plurality of flapping flying robots disclosed in JP 2003-341599 A communicates with a base station to receive instruction signals concerning various types of control from the base station.

SUMMARY

As disclosed in JP 2003-341599 A, when many flying robots are made to simultaneously float in midair, flying robots sometimes collide with each other. With an increase in a number of flying robots that are made to simultaneously float in midair, this problem becomes more conspicuous.

The present disclosure provides an unmanned aerial vehicle that autonomously avoids collision during flight in midair.

According to a first aspect of the present disclosure, an unmanned aerial vehicle capable of flying in midair is provided. The unmanned aerial vehicle includes a propulsion unit configured to generate a propulsion force for flight in midair, a laser light source configured to illuminate laser light, an imaging unit configured to generate a captured image by capturing vertically below the unmanned aerial vehicle, and a controller configured to control an operation of the propulsion unit. The controller analyzes a captured image, extracts a light spot formed by laser light, measures a positional relationship with another unmanned aerial vehicle based on the extracted light spot, and executes a collision avoidance operation with respect to another unmanned aerial vehicle based on the measured positional relationship.

Unmanned aerial vehicles according to the present disclosure perform collision avoidance operations, as needed, by grasping a positional relationship between the unmanned aerial vehicles based on light spots illuminated from the respective unmanned aerial vehicles, and hence can avoid collision between the unmanned aerial vehicles.

DETAILED DESCRIPTION

Hereinafter, exemplary embodiments will be described in detail with reference to the drawings as appropriate. It is to be noted, however, that detailed descriptions that are more than necessary may be omitted. For example, detailed descriptions of already well-known matters and duplicate descriptions for substantially the same components may be omitted. This is to avoid that the following description is unnecessarily redundant, and to facilitate the understanding of those skilled in the art.

Note that the attached drawings and the following description are provided for those skilled in the art to fully understand the present disclosure, and are not intended to limit the subject matter as described in the appended claims.

First Exemplary Embodiment

A first exemplary embodiment will be described below with reference to the attached drawings.

1. Arrangement of Aerial Video Display System

Figure 1:
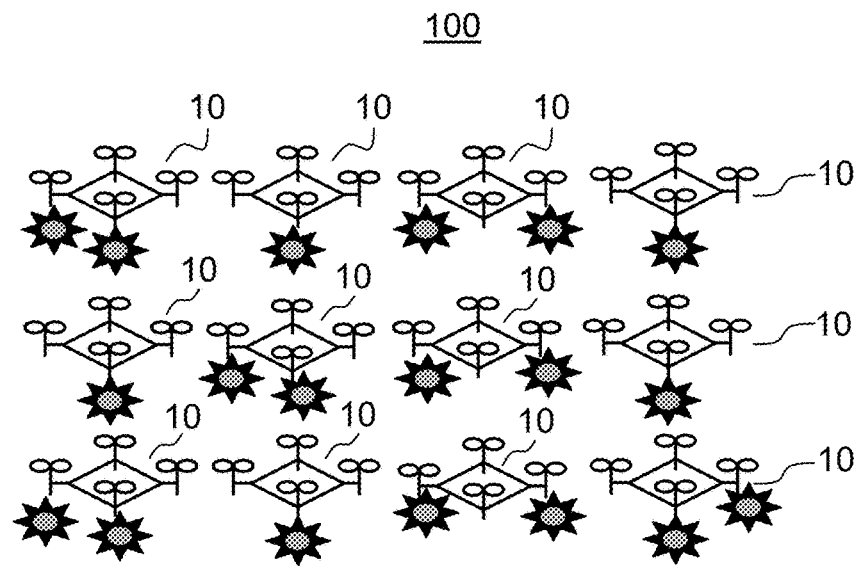
FIG. 1 is a view showing an arrangement of an aerial video display system according to a first exemplary embodiment.
Figure 1:
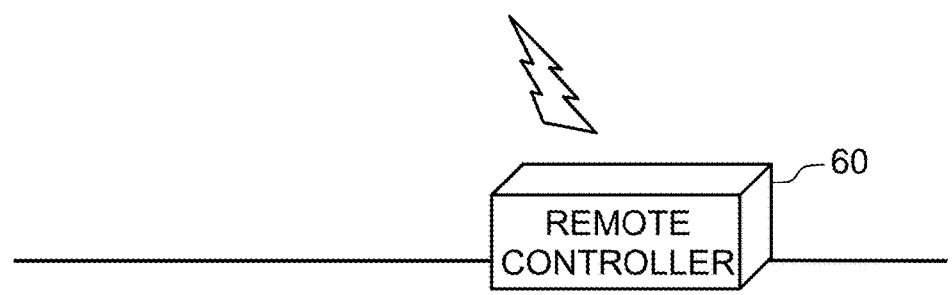

FIG. 1 is a view showing an arrangement of the aerial video display system according to this exemplary embodiment. Referring to FIG. 1, aerial video display system 100 is constituted by a plurality of unmanned unmanned aerial vehicles (UAV) 10 and remote controller 60.

Unmanned aerial vehicle 10 is an unmanned unmanned aerial vehicle to be automatically piloted, a so-called drone, which includes a light-emitting element. As shown in FIG. 1, an arbitrary video can be displayed by making a plurality of unmanned aerial vehicles 10 float in midair, disposing them at predetermined aerial positions, respectively, and making them emit light. For example, in a large site such as a stadium where sport competitions are held, various videos can be displayed to provide various dramatic scenes using light by making several ten to several hundred unmanned aerial vehicles 10 float in midair at a height from 2 m to 10 m and changing locations of unmanned aerial vehicles 10 and their light emissions, as needed.

Unmanned aerial vehicle 10 according to this exemplary embodiment, in particular, grasps a positional relationship with other unmanned aerial vehicles 10 and autonomously performs a collision avoidance operation when there is a possibility of collision. This prevents collision between unmanned aerial vehicle 10 and other unmanned aerial vehicles 10. Unmanned aerial vehicle 10 that performs such an autonomous collision avoidance operation will be described in detail below.

1.1 Arrangement of Unmanned Aerial Vehicle

Figure 2:
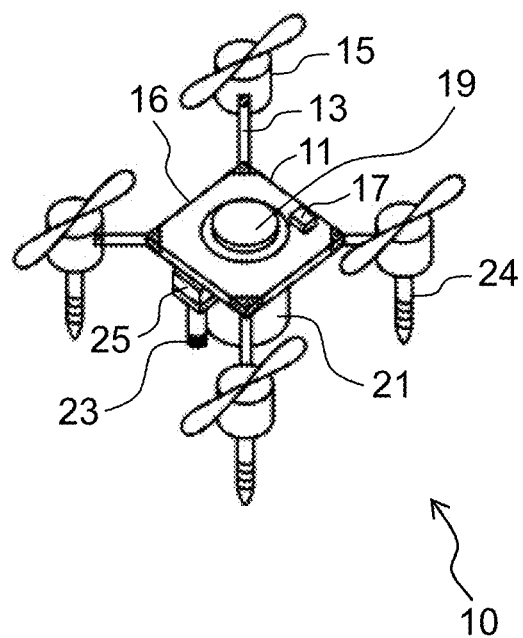
FIG. 2 is a view showing an arrangement of an unmanned aerial vehicle according to the first exemplary embodiment.
Figure 3:
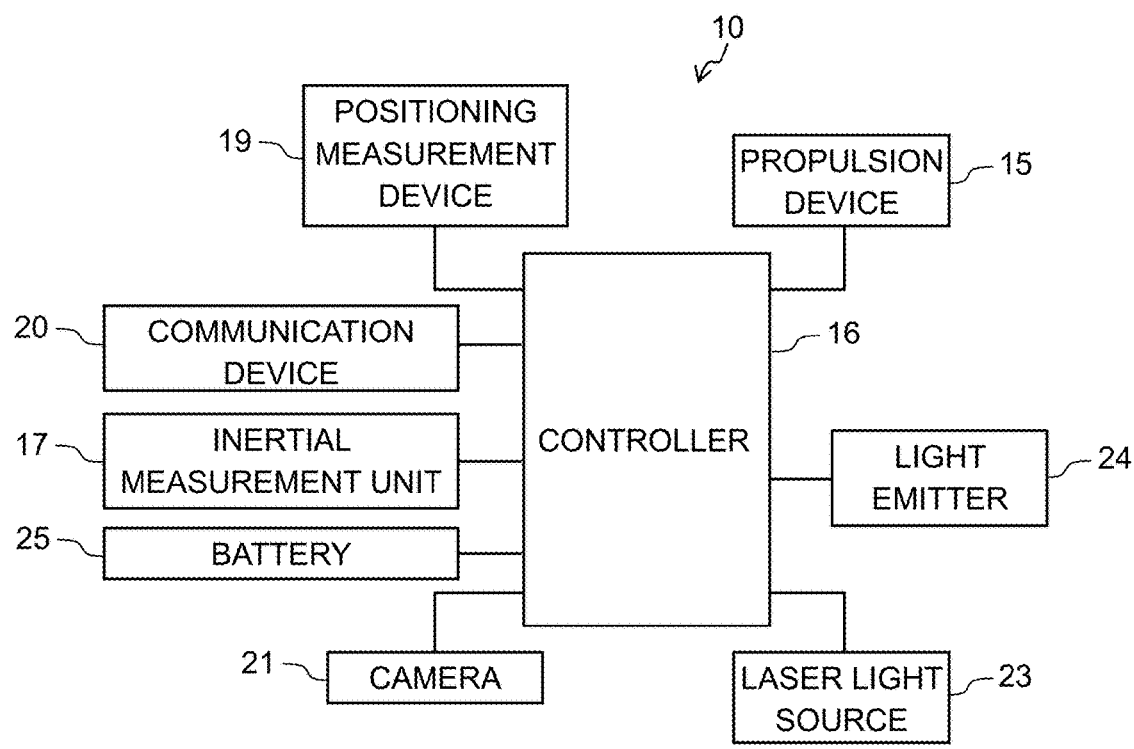
FIG. 3 is a block diagram of the unmanned aerial vehicle according to the first exemplary embodiment.

FIG. 2 is an external view of unmanned aerial vehicle 10 according to this exemplary embodiment. FIG. 3 is a block diagram showing a functional arrangement of unmanned aerial vehicle 10 according to the exemplary embodiment.

Unmanned aerial vehicle 10 includes main body 11 and propulsion devices 15 that generate propulsion forces for unmanned aerial vehicle 10. Each propulsion device 15 is attached to a distal end of support unit 13 extending from each of four corners of main body 11. Camera 21, battery 25, and laser light source 23 are attached to a lower side of main body 11. Inertial measurement device 17 and positioning measurement device 19 are attached to an upper side of main body 11. In addition, controller 16 and communication device 20 are housed in main body 11.

Each propulsion device 15 includes a propeller and a motor for rotating the propeller. In a case shown in FIG. 2, unmanned aerial vehicle 10 has four propulsion devices 15. However, a number of propulsion devices is not limited to four, and, for example, may be five or more. Controlling a number of rotations of the propeller equipped to each propulsion device 15, as needed, makes it possible to control a moving direction and a flight condition of unmanned aerial vehicle 10. Light emitter 24 is attached to a lower portion of each propulsion device 15. Light emitter 24 includes a plurality of light-emitting elements that emit red (R) light, green (G) light, and blue (B) light, and can emit light of various colors.

Camera 21 includes an image sensor such as a charge-coupled device (CCD) or complementary metal oxide semiconductor (CMOS), and generates image data by capturing an object. The generated image data is transmitted to controller 16. In this exemplary embodiment, camera 21 is attached to the lower side of main body 11 of unmanned aerial vehicle 10, and captures an image vertically below unmanned aerial vehicle 10 during flight of unmanned aerial vehicle 10.

Laser light source 23 includes a laser light-emitting element and illuminates laser light toward a position located vertically below unmanned aerial vehicle 10 during flight of unmanned aerial vehicle 10. Laser light may be either visible light or invisible light as long as it is light in a wavelength band in which camera 21 can capture.

Inertial measurement device 17 is a device that includes an acceleration sensor or gyro sensor and measures an acceleration or angular velocity of unmanned aerial vehicle 10. A behavior or posture of unmanned aerial vehicle 10 is controlled based on an output from inertial measurement device 17.

Positioning measurement device 19 receives a signal from a global positioning system (GPS) satellite and measures a current position of unmanned aerial vehicle 10.

Communication device 20 includes an electronic circuit for performing radio communication with remote controller 60 and receives a command concerning flight control, light emission control, or the like from remote controller 60.

Battery 25 supplies a power supply voltage to each element of unmanned aerial vehicle 10.

Unmanned aerial vehicle 10 having the above arrangement is remotely controlled to move to a predetermined position in midair and causes light emitter 24 to emit light. That is, unmanned aerial vehicle 10 receives, by radio communication, commands from remote controller 60 disposed on the ground. Unmanned aerial vehicle 10 performs flight control and light emission control based on the commands. Note that unmanned aerial vehicle 10 may receive commands by optical communication. Alternatively, unmanned aerial vehicle 10 may autonomously perform flight control and light emission control. In this case, unmanned aerial vehicle 10 is programmed in advance to move along a predetermined flight route and cause light emitter 24 to emit light in accordance with a predetermined light emission pattern.

2. Collision Avoidance Operation

Figure 4:
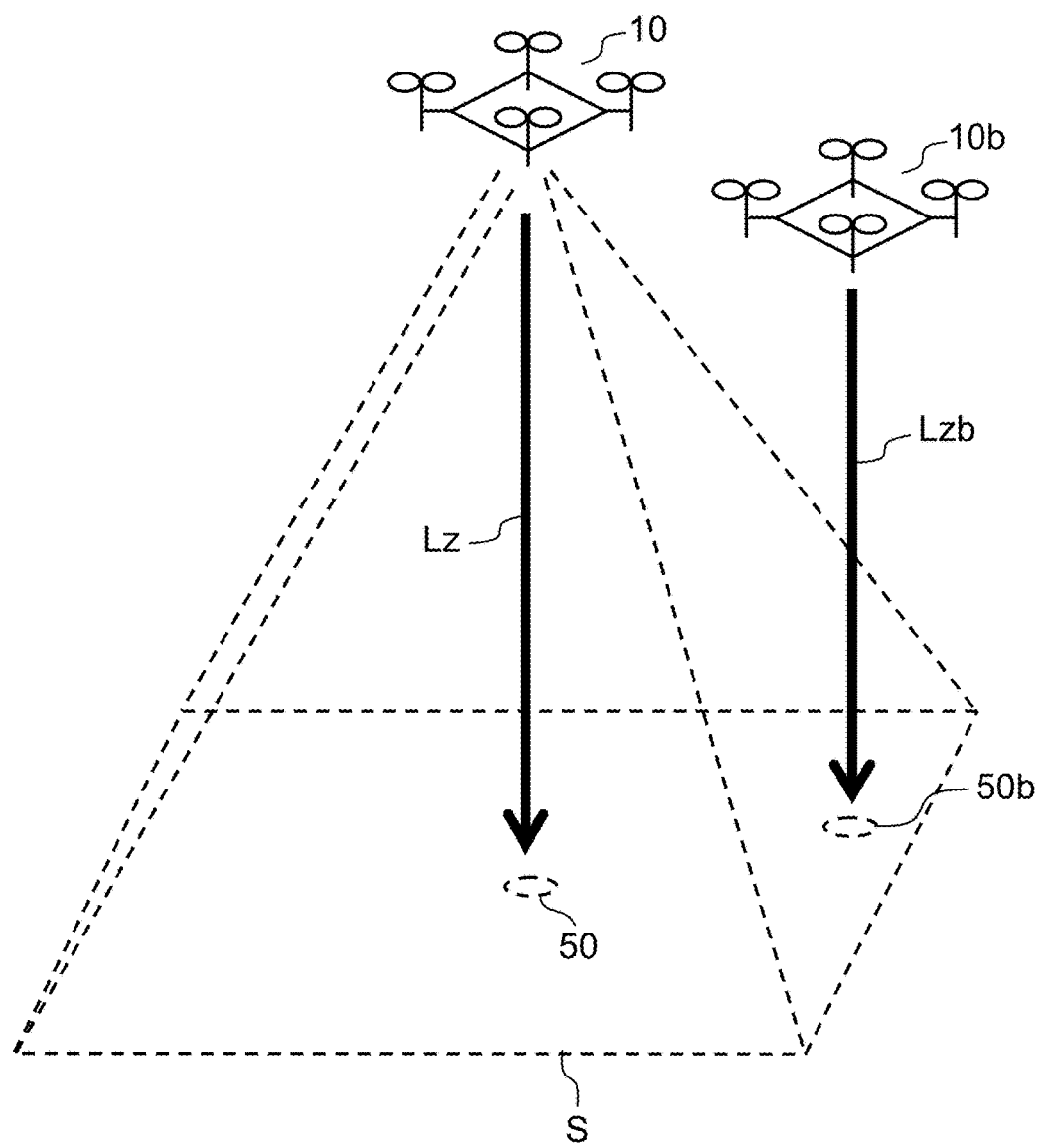
FIG. 4 is a view for explaining a method of recognizing positions of other unmanned aerial vehicles by using light spots formed by laser light illuminated from the unmanned aerial vehicles according to the first exemplary embodiment.

An autonomous collision avoidance operation of unmanned aerial vehicle 10 having the above arrangement will be described. FIG. 4 is a view for explaining a method of recognizing positions of other unmanned aerial vehicles by using light spots formed by laser light illuminated from unmanned aerial vehicles according to the first exemplary embodiment.

As shown in FIG. 4, arbitrary unmanned aerial vehicle 10 causes laser light source 23 to illuminate laser light Lz vertically below unmanned aerial vehicle 10 and also causes camera 21 to capture area S located vertically below unmanned aerial vehicle 10. Unmanned aerial vehicle 10 determines a possibility of collision with another unmanned aerial vehicle 10b from a positional relationship between light spot 50 formed by laser light Lz included in a captured image, which is illuminated from unmanned aerial vehicle 10, and light spot 50b formed by laser light Lzb illuminated from another unmanned aerial vehicle 10b. If there is a possibility of collision, unmanned aerial vehicle 10 performs an operation for avoiding collision.

Figure 5:
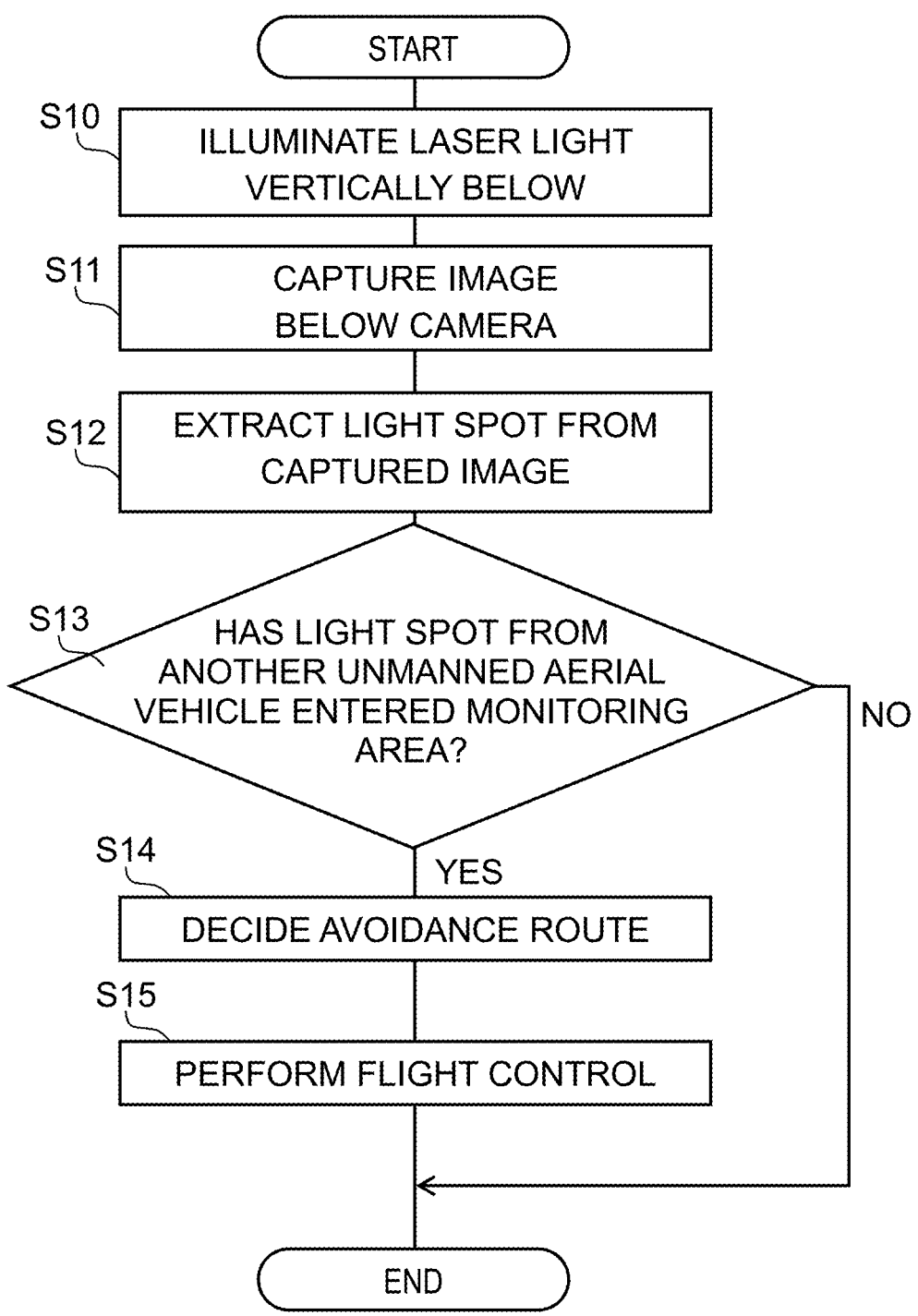
FIG. 5 is a flowchart showing a collision avoidance operation of the unmanned aerial vehicle according to the first exemplary embodiment.

FIG. 5 is a flowchart showing a collision avoidance operation of the unmanned aerial vehicle according to the first exemplary embodiment. The collision avoidance operation of unmanned aerial vehicle 10 will be described in detail with reference to the flowchart of FIG. 5.

In step S10, unmanned aerial vehicle 10 causes laser light source 23 to illuminate laser light Lz vertically below unmanned aerial vehicle 10 during flight in midair.

In step S11, unmanned aerial vehicle 10 causes camera 21 to capture area S located vertically below unmanned aerial vehicle 10.

In step S12, controller 16 of unmanned aerial vehicle 10 extracts a light spot formed by laser light by analyzing a captured image.

Figure 6A:
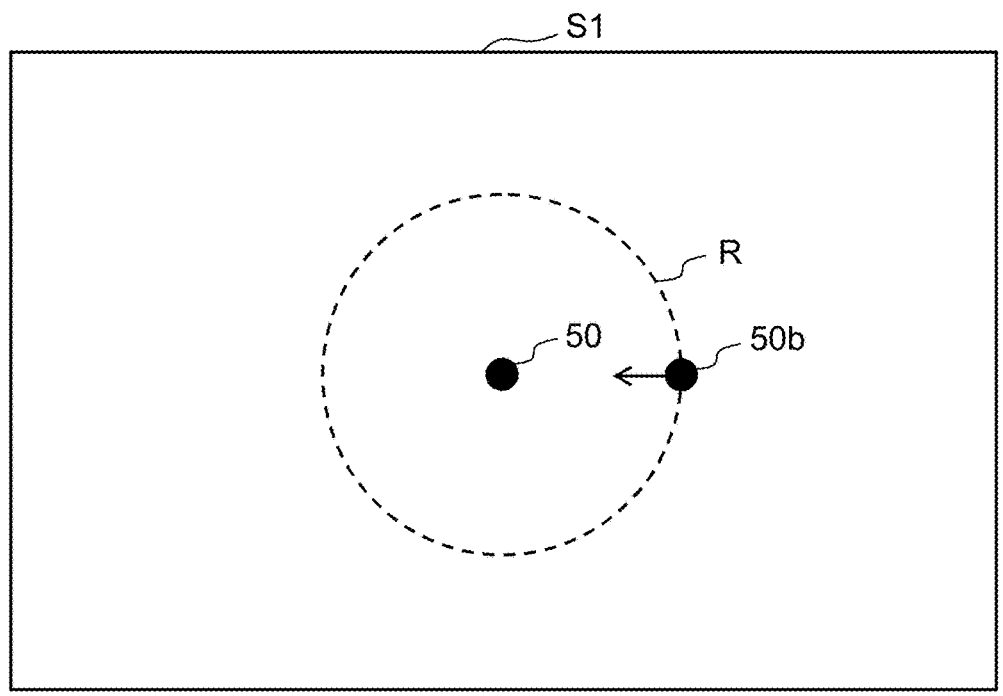
FIG. 6A is a view showing an example of a captured image obtained by capturing with a camera of the unmanned aerial vehicle according to the first exemplary embodiment.
Figure 6B:
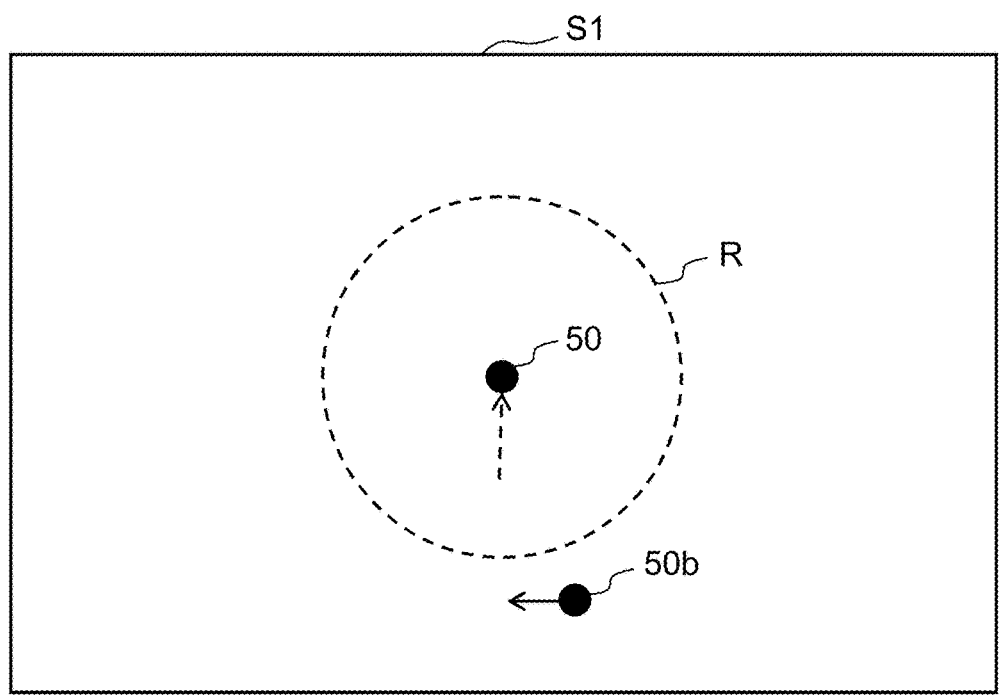
FIG. 6B is a view showing another example of a captured image obtained by capturing with the camera of the unmanned aerial vehicle according to the first exemplary embodiment.

In this case, FIGS. 6A and 6B are views each showing an example of a captured image obtained by causing camera 21 of unmanned aerial vehicle 10 to capture vertically below unmanned aerial vehicle 10. Controller 16 determines a light spot in a center of a captured image to be a light spot formed by a laser light from the local device, and determines any other light spot to be a light spot formed by laser light from another unmanned aerial vehicle 10b. Referring to FIGS. 6A and 6B, two light spots 50 and 50b are detected in captured image S1. Controller 16 determines light spot 50 in a center of captured image S1 to be a light spot formed by the local device, and determines another light spot 50b to be a light spot formed by another unmanned aerial vehicle 10b.

In step S13, because a position of a light spot corresponds to an x-y coordinate position of unmanned aerial vehicle 10, controller 16 determines a possibility of collision between unmanned aerial vehicle 10 and another unmanned aerial vehicle 10b based on a positional relationship between the light spots. Specifically, controller 16 sets, as monitoring area R, a range centered on a position of light spot 50 formed by the local device, with a predetermined distance being a radius, and determines whether light spot 50b other than light spot 50 formed by the local device has entered monitoring area R.

If light spot 50b formed by another unmanned aerial vehicle 10b has entered monitoring area R (YES in step S13), the process advances to step S14. If light spot 50b formed by another unmanned aerial vehicle 10b has not entered monitoring area R (NO in step S13), controller 16 terminates the collision avoidance operation.

In step S14, controller 16 decides a route for avoiding collision based on a movement of light spot 50b formed by another unmanned aerial vehicle 10b, mores specifically, a position, velocity, and moving direction.

In step S15, controller 16 controls propulsion device 15 to move along the decided route. This will avoid collision. When light spot 50b formed by another unmanned aerial vehicle 10b has entered monitoring area R, as shown in, for example, FIG. 6A, controller 16 avoids collision with another unmanned aerial vehicle 10b by moving the local device in a direction perpendicular to a moving direction of another unmanned aerial vehicle 10b, as shown in FIG. 6B.

Note that laser light illuminated from laser light source 23 of unmanned aerial vehicle 10 may be illuminated upon being modulated with a signal indicating identification information for identifying unmanned aerial vehicle 10. For example, laser light may be illuminated while blinking at high speed in accordance with identification information. In this case, a light spot also blinks at high speed in accordance with the identification information. This allows controller 16 to read the identification information from a light spot in a moving image as a captured image obtained by camera 21 and recognize the light spot from the local device, thereby accurately recognizing a position of the local device. In addition, controller 16 can accurately identify other unmanned aerial vehicles 10b flying around the local device.

As described above, according to this exemplary embodiment, when unmanned aerial vehicle 10 grasps a positional relationship between itself and another unmanned aerial vehicle 10b by observing a light spot formed by laser light illuminated from unmanned aerial vehicle 10 and determines that there is a possibility of collision, unmanned aerial vehicle 10 operates so as to avoid collision.

3. Effects and Other Benefits

As described above, unmanned aerial vehicle 10 according to this exemplary embodiment is an unmanned aerial vehicle capable of flying in midair, which includes propulsion device 15 (an example of propulsion unit) that generates a propulsion force for flight in midair, laser light source 23 that illuminates laser light, camera 21 (an example of an imaging unit) that generates a captured image by shooing vertically below unmanned aerial vehicle 10 during flight, and controller 16 that controls an operation of the propulsion unit. Controller 16 extracts light spots formed by laser light by analyzing a captured image, and measures a positional relationship with other unmanned aerial vehicles based on the extracted light spots. Controller 16 then executes a collision avoidance operation with respect to other unmanned aerial vehicles based on the measured positional relationship.

As described above, when unmanned aerial vehicle 10 grasps other unmanned aerial vehicles 10b existing around the local device by observing light spot 50 formed by laser light illuminated from unmanned aerial vehicle 10 and determines that there is a possibility of collision, unmanned aerial vehicle 10 operates so as to avoid collision. This makes it possible to implement an autonomous collision avoidance operation of unmanned aerial vehicle 10. According to this operation, unmanned aerial vehicles 10 need not communicate with each other, and need not include any communication device, for example, any radio communication device.

The first exemplary embodiment has been described above as an example of the technique disclosed in the present disclosure. However, the technique in the present disclosure is not limited to the first exemplary embodiment, and can also be applied to exemplary embodiments in which a change, a replacement, an addition, or an omission is appropriately made. A new exemplary embodiment can also be made by a combination of the components of the first exemplary embodiment.

The exemplary embodiment has been described above as an example of a technique according to the present disclosure. The attached drawings and detailed descriptions have been provided for this purpose.

Accordingly, the constituent elements described in the attached drawings and detailed descriptions may include not only constituent elements that are essential to solve the problem but also constituent elements that are provided as examples used to exemplify the technique and are not essential to solve the problem. Therefore, it should not be immediately construed that these components that are not essential are essential even if the components are described in the attached drawings and the detailed descriptions.

The above exemplary embodiment is provided to exemplify the technique according to the present disclosure. Therefore, it is possible to make various changes, replacements, additions, omissions, and the like within the scope of the claims and equivalents thereof.

The present disclosure is effective for an unmanned aerial vehicle that flies in midair and can autonomously avoid collision.

What is claimed is:

1. An unmanned aerial vehicle that is configured to fly in midair, the unmanned aerial vehicle comprising:
   a propulsion unit configured to generate a propulsion force for fly in midair;
   a laser light source configured to illuminate laser light;
   an imaging unit configured to generate a captured image by capturing vertically below the unmanned aerial vehicle during flight in midair; and
   a controller configured to control an operation of the propulsion unit,
   wherein the controller analyzes the captured image, extracts a light spot formed by the laser light, measures a positional relationship with another unmanned aerial vehicle based on the light spot, and executes a collision avoidance operation with respect to the other unmanned aerial vehicle based on the positional relationship.

2. The unmanned aerial vehicle according to claim 1, wherein the controller transmits identification information for identifying the unmanned aerial vehicle by using the laser light.

3. The unmanned aerial vehicle according to claim 1, wherein the controller determines a light spot in a center of the captured image to be a light spot formed by laser light from the unmanned aerial vehicle and determines another light spot to be a light spot formed by laser light from another unmanned aerial vehicle.

4. The unmanned aerial vehicle according to claim 3, wherein the controller executes the collision avoidance operation when the other light spot has entered a predetermined range centered on the light spot formed by the laser light from the unmanned aerial vehicle.

* * * * *